(12) United States Patent
Cheng

(10) Patent No.: US 6,712,432 B1
(45) Date of Patent: Mar. 30, 2004

(54) WHEEL COVER SIMULATING A HIGH PROFILE AUTOMOTIVE WHEEL AND TIRE

(76) Inventor: John C. Cheng, 768 S. Turnbull Canyon Rd., Industry, CA (US) 91745

( * ) Notice: Subject to any disclaimer, the term of this patent is extended or adjusted under 35 U.S.C. 154(b) by 39 days.

(21) Appl. No.: 10/225,644

(22) Filed: Aug. 23, 2002

(51) Int. Cl.$^7$ .................................................. B60B 7/04
(52) U.S. Cl. .............................. 301/37.23; 301/37.101; 301/37.106
(58) Field of Search ..................... 301/37.101, 37.22, 301/37.23, 37.102, 37.31, 37.32, 37.33, 37.106

(56) References Cited

U.S. PATENT DOCUMENTS

| | | | | |
|---|---|---|---|---|
| 1,403,446 A | * | 1/1922 | Rothmann | |
| 1,972,216 A | * | 9/1934 | Dowty | |
| 2,368,251 A | * | 1/1945 | Lyon | |
| 2,443,627 A | * | 6/1948 | Lyon | |
| RE25,397 E | * | 6/1963 | Lyon | |
| 4,235,271 A | * | 11/1980 | Olsen et al. | |
| 5,372,406 A | * | 12/1994 | Ohtsuka et al. | 301/37.23 |

* cited by examiner

Primary Examiner—Russell D. Stormer
(74) Attorney, Agent, or Firm—Albert O. Cota

(57) ABSTRACT

A wheel cover (20) that simulates a high profile automotive wheel and tire. The wheel cover (20) includes a base mounting plate (26) that is removably attached to a wheel (22) using conventional methods. A face plate (38), which is configured to partially cover the tire sidewall as well as a central portion of a wheel, is positioned on top of the base mounting plate (26). The mounting plate (26) is attached to the face plate (38) in a spring-loaded manner, which continually urges the face plate (38) to be in contact with the side wall of the tire (24). The spring-loading arrangement permits the face plate (38) to yield when the tire bulges due to weight induced distortion or road hazard impact. The face plate (38) gives way at the tire bulge and yet retains contiguous engagement with the tire. When attached, the face plate (38) extends outward from the wheel's outer perimeter and over a portion of the tire's sidewall, thus producing the appearance of a high profile wheel and tire.

17 Claims, 6 Drawing Sheets

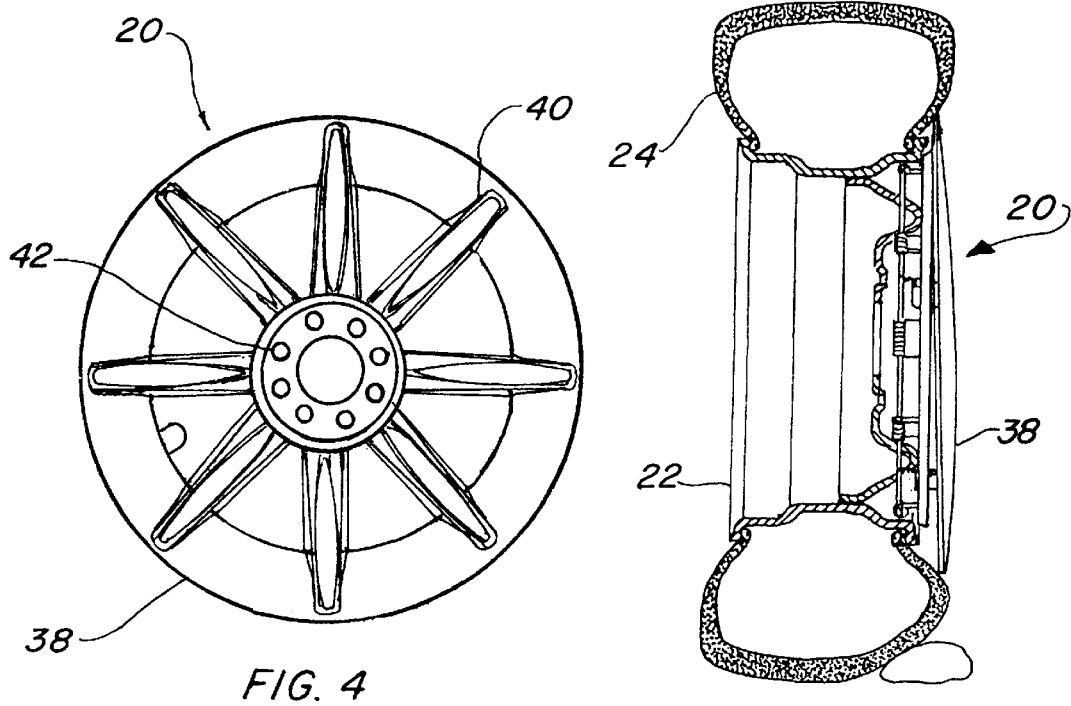
FIG. 4
FIG. 5
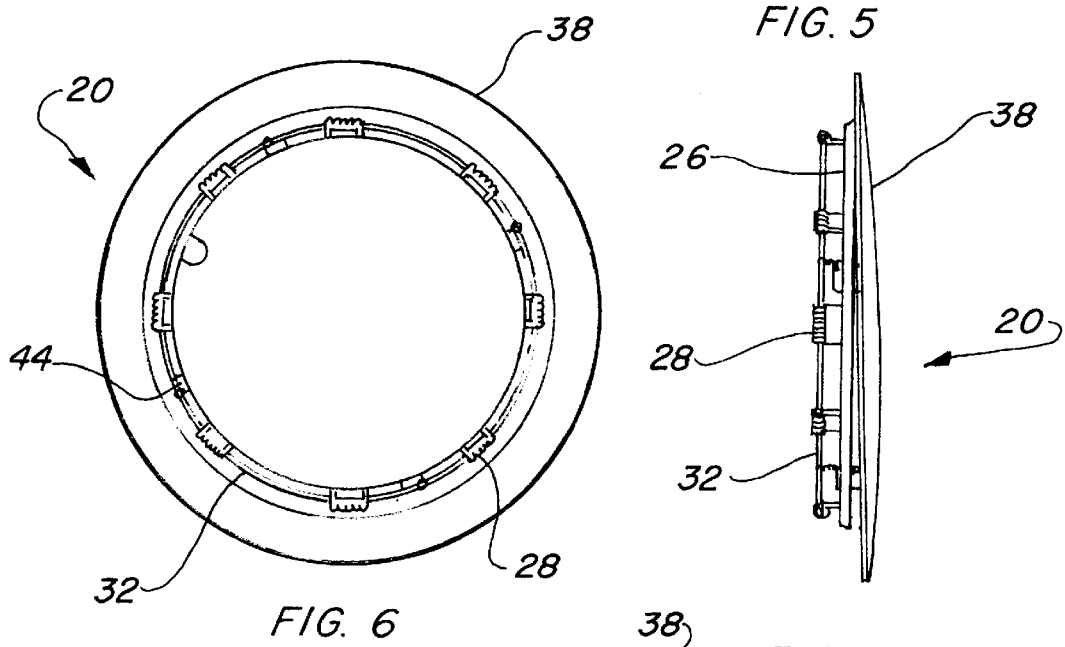
FIG. 6
FIG. 7
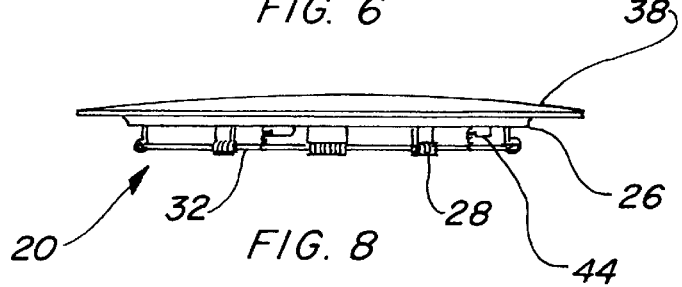
FIG. 8

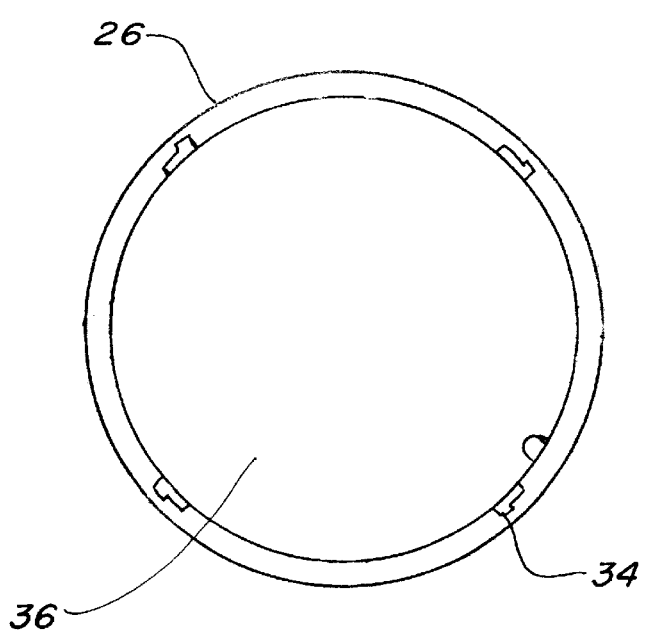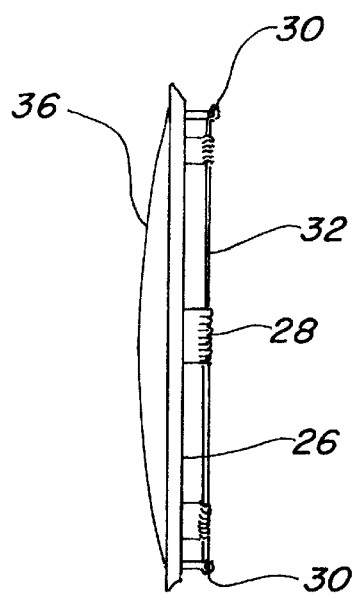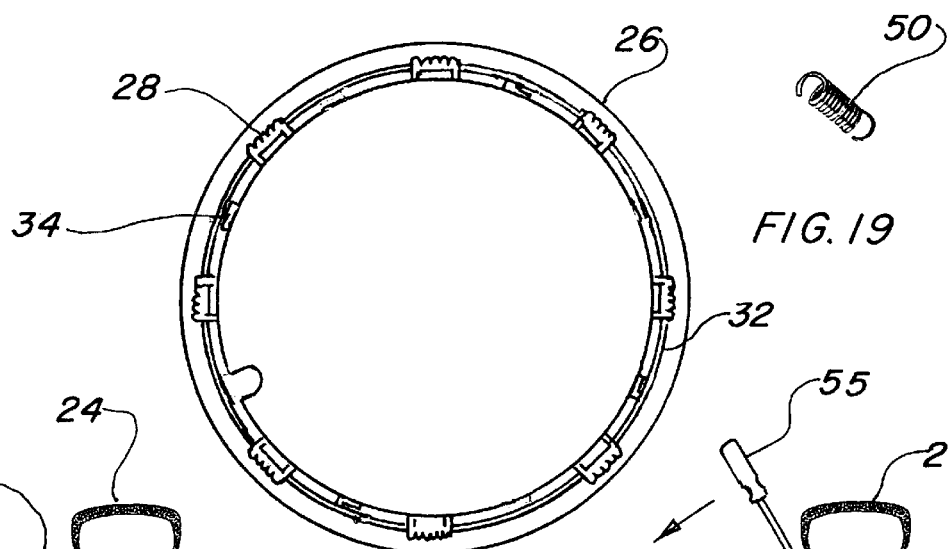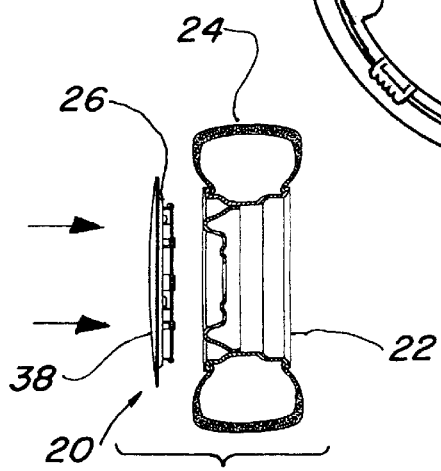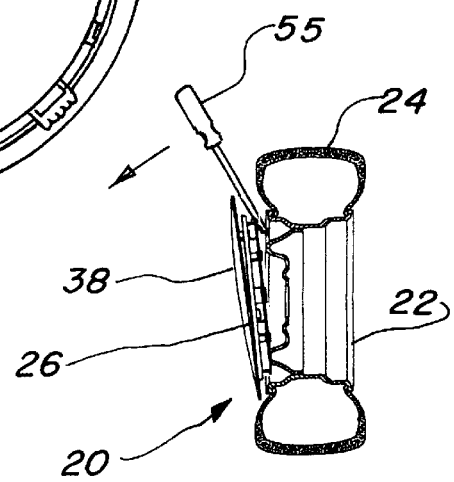
FIG. 16  FIG. 17  FIG. 19  FIG. 18  FIG. 20  FIG. 21

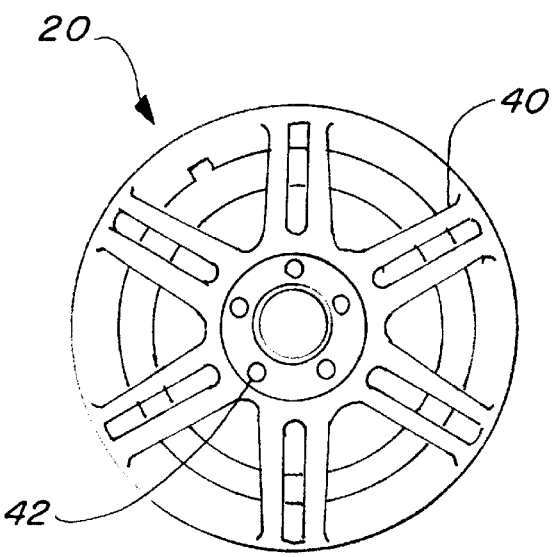
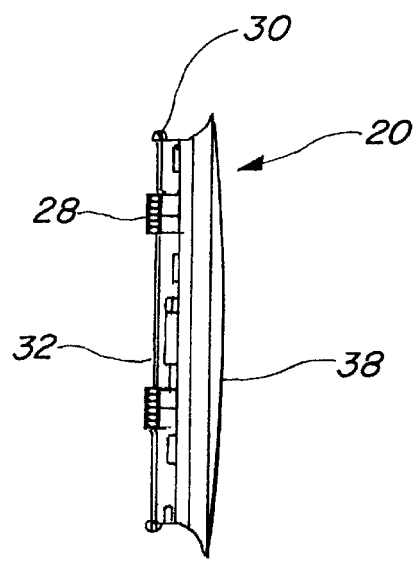
FIG. 22　　　FIG. 23
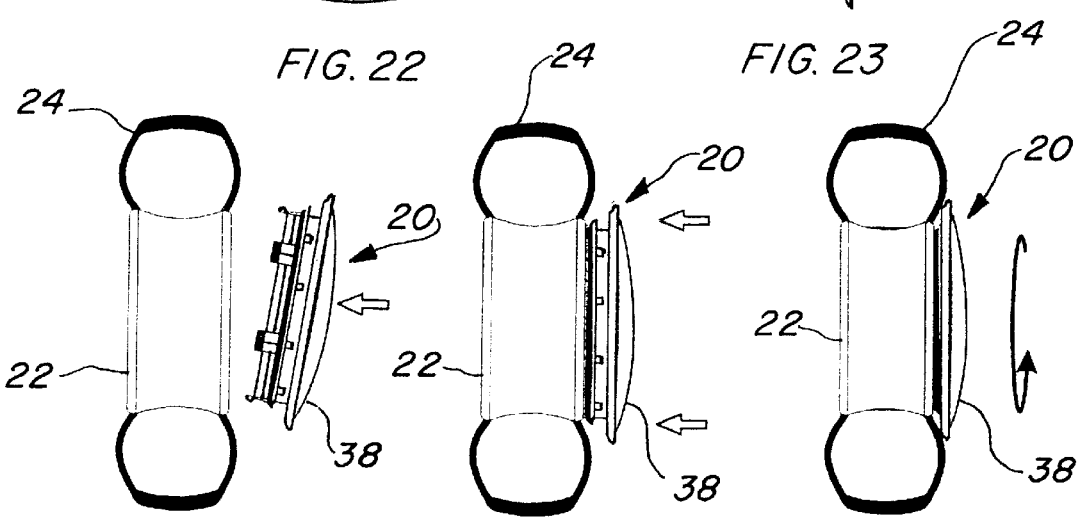
FIG. 24　　　FIG. 25　　　FIG. 26
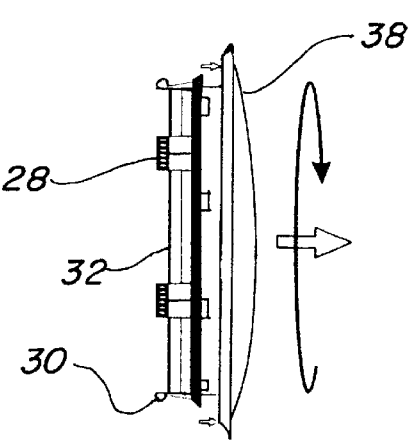
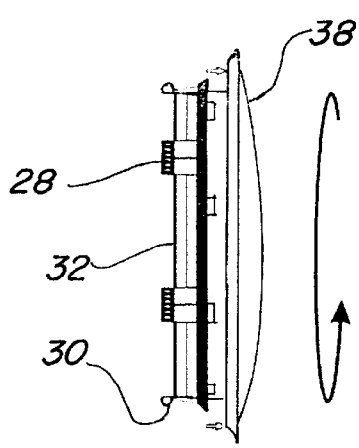
FIG. 27　　　FIG. 28

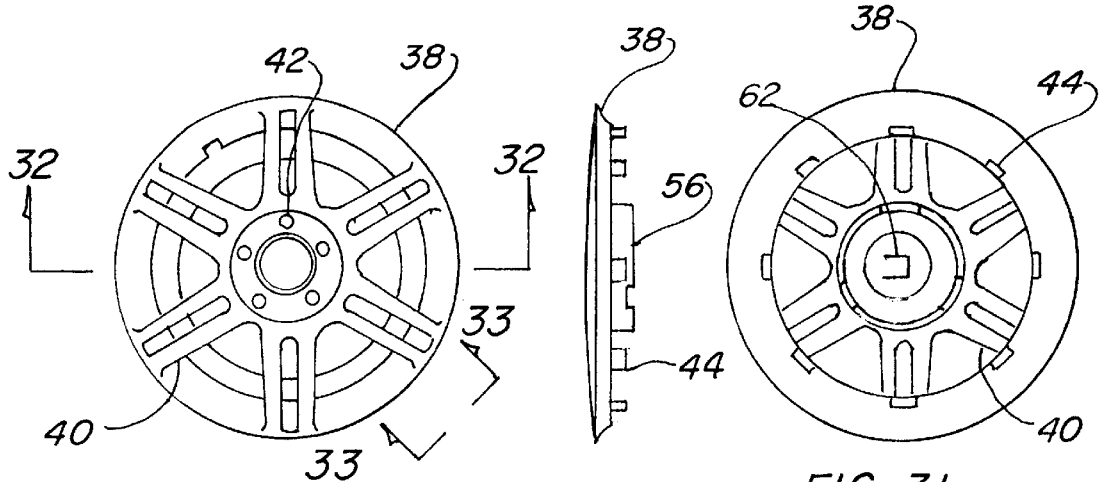
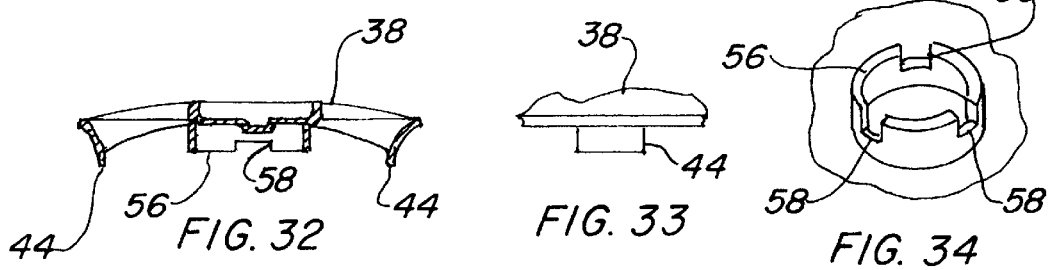
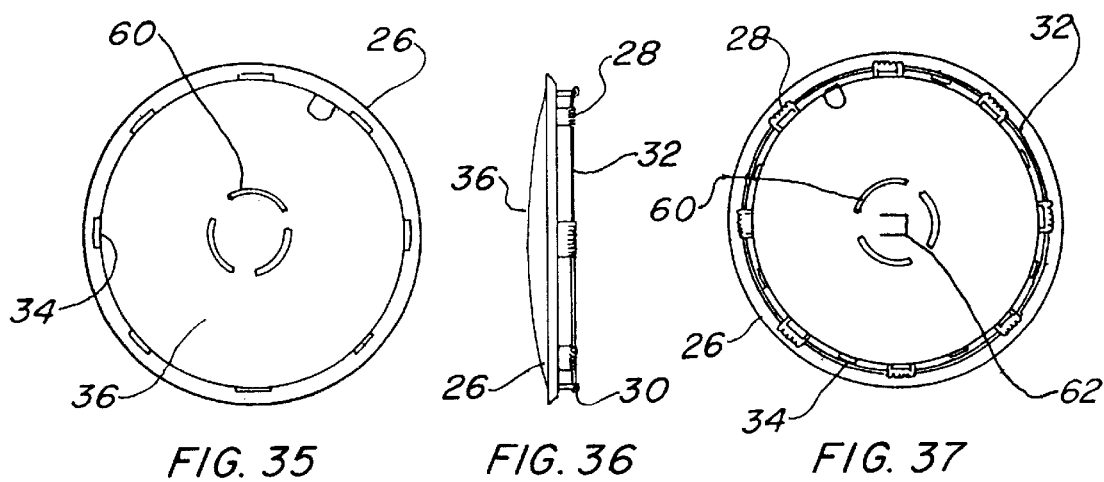
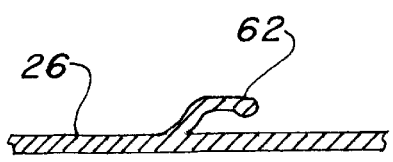
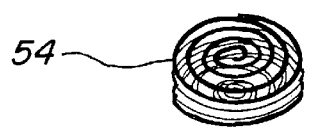

WHEEL COVER SIMULATING A HIGH PROFILE AUTOMOTIVE WHEEL AND TIRE

TECHNICAL FIELD

The present invention pertains generally to wheel covers and more particularly to a wheel cover that simulates a high profile wheel and tire by covering an inner portion of a conventional tire sidewall.

BACKGROUND ART

Previously, many types of wheel covers have been used to provide attractive designs and the currently popular types of wheels. For example, considerable effort has been made to simulate a cast aluminum rim by the use of a shielding disc with a cover that has individual sections such as spokes. Many other wheel covers have the capability of displaying indicia and designs that include symmetrical design arrays as well as decorative designs using irregular shaped voids.

The prior art listed below did not disclose patents that possess any of the novelty of the instant invention, however the following U.S. patents are considered related:

| U.S. Pat. No. | Inventor | Issue Date |
| --- | --- | --- |
| 5,316,376 | Defreitas | May 31, 1994 |
| 5,457,886 | Fuller | Oct. 17, 1995 |
| 5,795,035 | Fuller | Aug. 18, 1998 |
| 5,931,543 | Smith | Aug. 3, 1999 |
| 6,309,027 | Smith | Oct. 30, 2001 |
| 6,409,277 | Nunes et al. | Jun. 25, 2002 |

U.S. Pat. No. 5,316,376 discloses a vehicle wheel cover adapted to clip on a wheel rim. The cover includes a disc which has decorative indicia, such as a photograph or artwork, that has a convex lens superposed thereon to magnify the image.

U.S. Pat. No. 5,457,886 discloses a wheel cover that simulates a cast aluminum wheel made of stamped sheet metal. The cover has windows with inward-angled borders simulating depth and a flange on the periphery. A retainer ring is mounted interiorly within the flange and the flange is rolled over to complete the assembly.

U.S. Pat. No. 5,795,035 discloses a wheel cover simulating a cast aluminum wheel with the front face machined on a numerically-controlled lathe such that the cutting tool closely follows the contour to form fine spiral grooves which represent machine markings.

U.S. Pat. No. 5,931,543 discloses a disc wheel cover which forms optical illusions, such as spiral patterns. The wheel cover has fasteners that mate with fasteners located on the outer ring of an existing wheel cover.

U.S. Pat. No. 6,309,027 discloses a removable wheel cover having perforated patterns of circles, rectangles or the like. The perforations may be a single closed pattern or a ring a pattern around the perimeter of the wheel cover.

U.S. Pat. No. 6,409,277 discloses a vehicle wheel cover that replicates the intrinsic design of a vehicle wheel including a central aperture having a set of lug nuts. The wheel cover has spaced fasteners that clip into the peripheral edge of the vehicle wheel For background purposes and as indicative of the art to which the invention is related reference may be made to the design patent issued to Brintouch U.S. Pat. No. Des. 457, 116.

DISCLOSURE OF THE INVENTION

High profile wheels and tires are a popular item in the automotive industry and have been accepted by the public as an fashionable addition to an automobile, since for decades special wheels and tires have been a desirable aftermarket cosmetic improvement. A set of conventional high profile wheels and tires are relatively expensive when compared to standard wheels and tires, thus limiting the market to those who can afford to spend the extra money to update the looks and performance of their vehicle.

Therefore, the primary object of the invention is to simulate a high profile tire by utilizing a wheel cover that obscures a portion of the sidewall of a conventional tire since high performance tires have a low profile and require a larger diameter wheel. The invention further simulates the configuration of the wheel by extending the outer perimeter of the cover.

An important object of the invention overcomes the problem created when the tire bulges. Tires have the propensity to bulge due to weight induced distortion and road hazard impact particularly with radial tires. This phenomenon is overcome by spring-loading the face plate to the base mounting plate, thus permitting the face plate to give way at the point of the tire bulge while retaining contiguous engagement of the tire opposite the bulge.

Another object of the invention is the ease of assembly and removal, as the base mounting plate is attached to the automotive wheel in a conventional manner and the face plate is simply pulled away and a tool such as a screwdriver is wedged between the rim and the mounting plate which is intuitively obvious.

Still another object of the invention is that the wheel cover is secure enough to stay on the wheel during high speeds without shaking or vibrating. It has been found that during dynamic tests the spring-loading feature achieves this goal even when the tire is repeatedly bulges at high frequencies.

A final object of the invention provides an inexpensive alternative to enhance the appearance of an automobile or truck, as existing tires and wheels are used and only the wheel covers are replaced.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is a front elevational view of the preferred embodiment.

FIG. 5 is a cross-sectional view of the invention attached to a rim and tire with the tire shown deflected by a road obstruction.

FIG. 6 rear view of the preferred embodiment.

FIG. 7 is a side view of the preferred embodiment with the face plate forced away from the base mounting plate, at the bottom, under spring tension.

FIG. 8 is a bottom view of the preferred embodiment.

FIG. 16 is a front view of the base mounting plate completely removed from the invention for clarity.

FIG. 17 is a side elevation view of the base mounting plate completely removed from the invention for clarity.

FIG. 18 is a rear view of the base mounting plate completely removed from the invention for clarity.

FIG. 19 is a partial isometric view of one of the extension springs completely removed from the invention for clarity.

FIG. 20 is a cross-sectional view of a tire and rim with the invention ready for installation.

FIG. 21 is a cross-sectional view of a tire and rim with the invention being removed with a tool.

FIG. 22 is a front view of the second embodiment of the invention.

FIG. 23 is a side view of the second embodiment of the invention.

FIG. 24 is a cross-sectional view of a tire and rim with the second embodiment of the invention being ready to be installed on the rim.

FIG. 25 is a cross-sectional view of a tire and rim with the second embodiment of the invention being started to be installed on the rim.

FIG. 26 is a cross-sectional view of a tire and rim with the second embodiment of the invention installed and rotated to be locked in place.

FIG. 27 is a cross-sectional view of a tire and rim with the second embodiment of the invention being locked in the opened position by lifting and rotating ¼ turn to be installed on the rim.

FIG. 28 is a cross-sectional view of a tire and rim with the second embodiment of the invention being rotated ¼ turn to release from the rim.

FIG. 29 is a front elevational view of the second embodiment of the face plate completely removed from the invention for clarity.

FIG. 30 is a side elevational view of the second embodiment of the face plate completely removed from the invention for clarity.

FIG. 31 is a rear elevational view of the second embodiment of the face plate completely removed from the invention for clarity.

FIG. 32 is a cross-sectional view taken along lines 32—32 of FIG. 29.

FIG. 33 is a view taken along lines 33—33 of FIG. 29.

FIG. 34 is a fragmentary isometric view of the spring retaining cup of the second embodiment of the invention.

FIG. 35 is a front elevational view of the second embodiment of the base mounting plate completely removed from the invention for clarity.

FIG. 36 is a side elevational view of the second embodiment of the base mounting plate completely removed from the invention for clarity.

FIG. 37 is a rear elevational view of the second embodiment of the base mounting plate completely removed from the invention for clarity.

FIG. 38 is an arbitrary cross-sectional view of the spring catch protruding from the base mounting plate of the second embodiment.

FIG. 39 is a partial isometric view of the extension spring of the second embodiment completely removed from the invention for clarity.

BEST MODE FOR CARRYING OUT THE INVENTION

Figure 1:
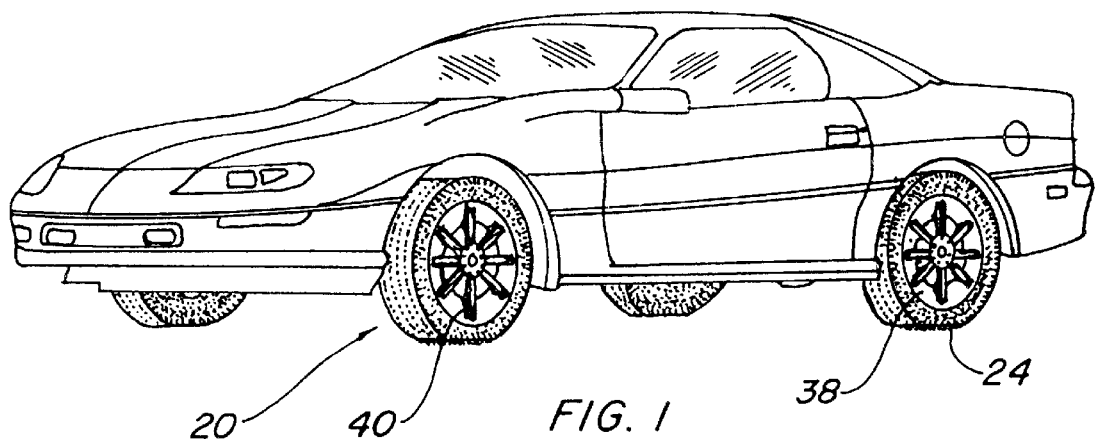
FIG. 1 is a partial isometric view of the preferred embodiment of the wheel cover installed on an automobile.
Figure 2:
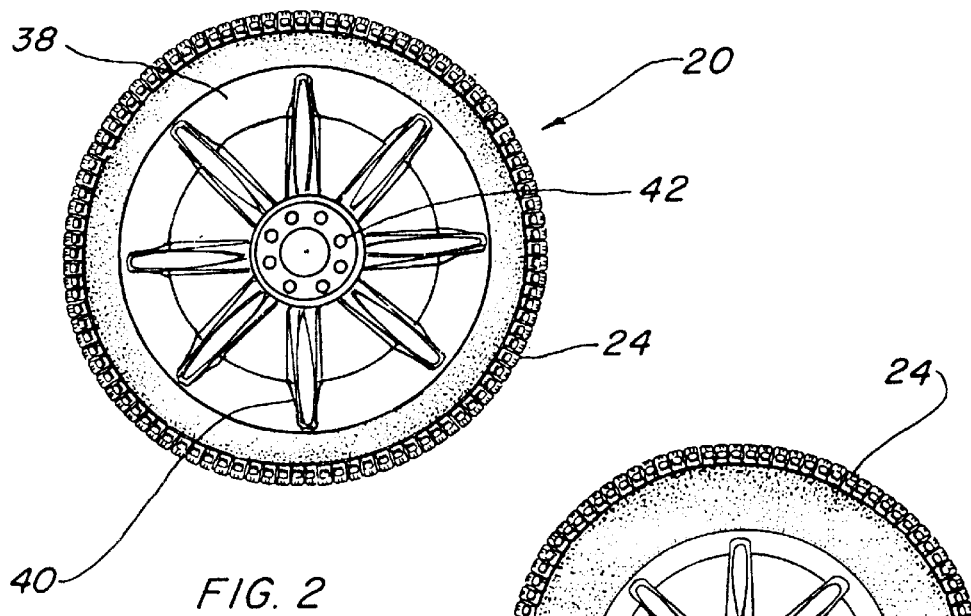
FIG. 2 is a front elevational view of the preferred embodiment installed on a rim with a conventional tire simulating a high performance tire.
Figure 3:
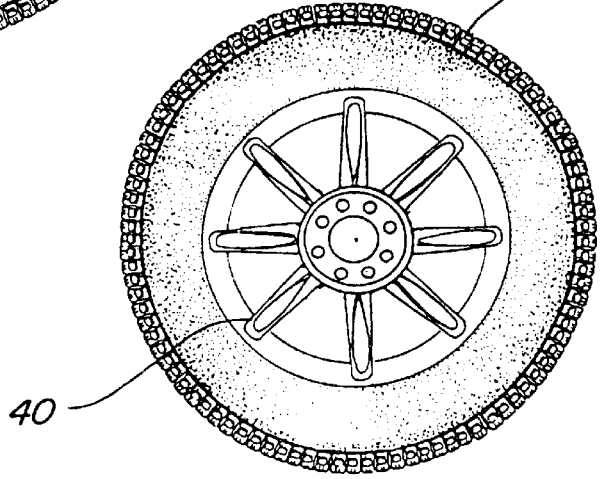
FIG. 3 a front elevational view of a prior art wheel cover installed on the same size rim and conventional tire as depicted in FIG. 2.
Figure 9:
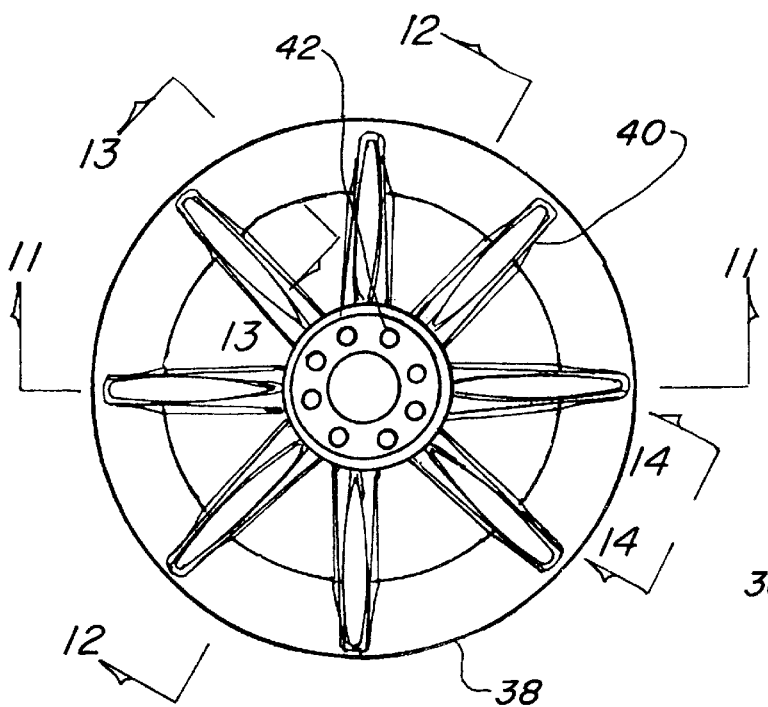
FIG. 9 is a front elevational view of the face plate completely removed from the invention for clarity.
Figure 10:
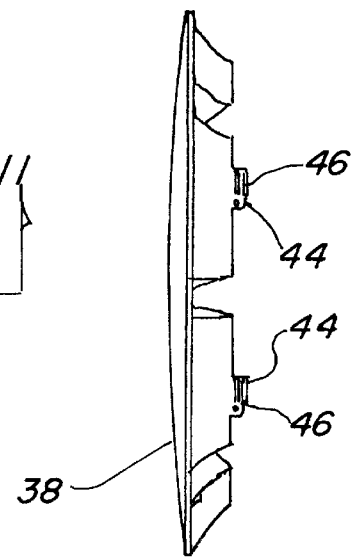
FIG. 10 is a side elevational view of the face plate completely removed from the invention for clarity.
Figure 11:
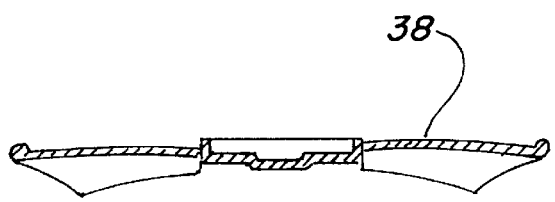
FIG. 11 is a cross-sectional view taken along lines 11—11 of FIG. 9.
Figure 13:
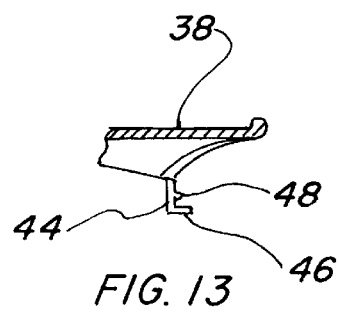
FIG. 13 is a cross-sectional view taken along lines 13—13 of FIG. 9.
Figure 12:
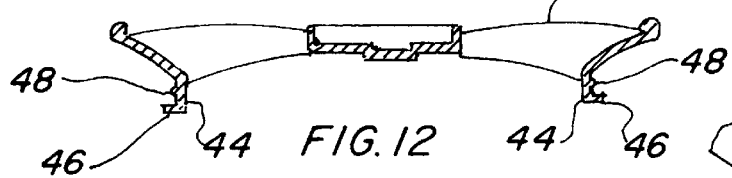
FIG. 12 is a cross-sectional view taken along lines 12—12 of FIG. 9.
Figure 14:
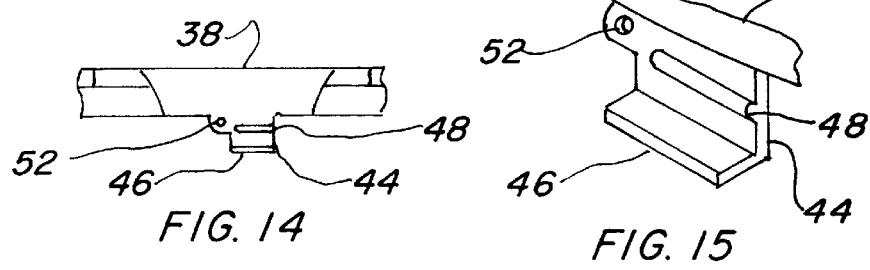
FIG. 14 is a view taken along lines 14—14 of FIG. 9.
Figure 15:
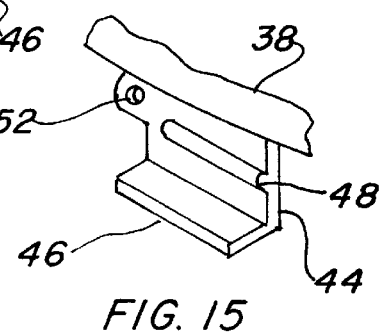
FIG. 15 is a fragmentary view of one of the securing tabs completely removed from the invention for clarity.

The best mode for carrying out the invention is presented in terms of a preferred and second embodiment. Both embodiments are basically the same with the exception of the type of spring used to hold the main elements together. The preferred embodiment, as shown in FIGS. 1 through 21, is comprised of a wheel cover 20 that simulates a high profile automotive wheel 22 and tire 24. A base mounting plate 26, as shown removed from the invention in FIGS. 16–18, is removably attached to the wheel 22 and contains a plurality of ring securing members 28 that are spaced in a radial array adjacent to the periphery of the mounting plate 26. Each ring securing member 28 includes a groove 30, with a steel ring 32 disposed within the grooves 30 to provide a positive attachment of the base mounting plate 26 to the wheel 22. This type of attachment is well known in the art and is in common usage today.

The base mounting plate 26 further has a plurality of securing tab slots 34 located adjacent to the mounting plate's periphery, as illustrated best in FIG. 16, and is configured with a dome shaped body 36 facing outward from the wheel 22 as shown in FIG. 17. The base mounting plate 26 is preferably fabricated of acrylonitrile butadeine styrene thermoplastic, which is better known as (ABS), however other types of thermoplastic may be used as well and are perfectly acceptable in this application.

A face plate 38, as illustrated by itself in FIGS. 9–15, is juxtaposed on the base mounting plate 26 and is configured to partially cover the sidewall of the tire 24 in conjunction with a central portion of the wheel 22. A plurality of individual sections, such as spokes 40 extend from a central point above the wheel 22, thus simulating a typical high profile automotive wheel. A centrally positioned raised portion of the face plate 38 simulates a plurality of lug bolts 42 that are spaced on a diametrical bolt center. It should be noted that the number, style and shape of the spokes 40 may vary considerably as to their configuration or location. The simulated lug bolts 42 may also be omitted and still fall within the scope of this invention as this design characteristic is basically for its aesthetic properties. The object of the invention is to provide an impression of a high profile wheel and tire.

The face plate 38 utilizes a plurality of securing tabs 44, each having an outward-facing flange 46. When the face plate 38 is forced away from one side of the tire 24 by tire bulging, the flange 46 catches the edge of the slot 34 in the base mounting plate 26, thereby preserving a mechanical association between the base mounting plate 26 and the face plate 38. It is well known that tires deflect under the weight of the vehicle and have a tendency to bulge on the lower portion during operation. As this phenomenon occurs repeatably and at various degrees of deflection the securing tab 44 includes an integral, self-adjusting ridge 48 between the outward facing flange 46 and the body of the face plate 38. The addition of the ridge 48 provides a self-adjusting position when the face plate 38 is forced away from one side of the tire 24 by the bulging as the ridge 48 catches at an intermediate position due to the radial shape of the ridge 48.

The face plate 38 is also fabricated of thermoplastic, which is preferably the same acrylonitrile butadeine styrene (ABS), however the face plate 38 is usually painted in selectable colors or chrome plated to provide a finish imitating a high profile wheel.

Means for urging the face plate 38 toward the base mounting plate 26 is provided in the form of a plurality of extension springs 50 having looped ends that are attached between the face plate 38 and the base mounting plate 26, thus maintaining a close relationship therebetween. The springs 50 are looped over the steel ring 32 on one end and through a hole 52 in the securing tab 44 on the other. FIGS. 5, 7 and 8 illustrate the location of the springs 50, and the spring itself is shown in FIG. 19. Since there are a number of springs 50 evenly spaced around the wheel cover 20, the angular relationship between the face plate 38 and the base mounting plate 26 may vary from any position. Thus, the individual spring compression rate changes relative to the location of the point of movement and yet the elements will be pulled together when deflection ceases. The spring-loading allows the to the face plate 38 and the base mounting plate 26 to separate when the tire 24 bulges due to weight induced distortion or road hazard impact, thus permitting the face plate 38 to give way at the tire bulge while retaining contiguous engagement of the face plate 38 to the tire 24.

FIG. 20 indicates, by the directional arrows, how the wheel cover 20 in the preferred embodiment is installed, which is accomplished by pressing on the outer surface of the face plate 38 to force the securing tabs 44, which are attached together by the steel ring 32, into a mating groove in the wheel 22. Removal of the wheel cover 20 is depicted in FIG. 21, which is accomplished by pulling the spring-loaded face plate 38 away from the base mounting plate 26 and inserting a tool, such as the sharp end of a lug wrench or a screwdriver 55, between the base mounting plate 26 and the wheel 22. The tool causes the elements to separate, and when forced in lever fashion as indicated in the drawing with an arrow, complete separation is accomplished The second embodiment is illustrated in FIGS. 22–39 and incorporates all of the same elements as the preferred embodiment except for the type of spring-loading that holds the face plate 38 to the base mounting plate 26, which requires some minor modifications to the basic elements.

The plurality of extension springs 50 with looped ends are substituted with a single extension spring having inward-facing ends 54, as shown in FIG. 39. The spring 54 is centrally positioned between the face plate 38 and the base mounting plate 26 that includes the addition of an integrally formed, spring retaining cup 56 depicted in FIG. 34. The spring retaining cup 56 has notches 58 that slideably interface with mating spring retaining slots 60 in the base plate 26. The spring retaining cup 56 also surrounds the extension spring with inward-facing ends 54. The spring 54 is held in place with spring catches 62, as shown in FIG. 38, that have been added to both the base mounting plate 26 and face plate 38. The catches 62 are located adjacent to the spring's inward-facing ends, which permits the spring 54 to be simultaneously attached to both the base mounting plate 26 and face plate 38. It should be noted that the flanges 46 and self-adjusting ridges 48 on the securing tabs 44 of the face plate 38 are optional in this second embodiment.

Installation of the second embodiment of the invention is illustrated in FIGS. 24–26 with the wheel cover 20 placed in front of the wheel, as shown in FIG. 24, and then lifting and quarter turning the wheel cover 20 counter clockwise to lock in the separated position. The wheel cover 20 is then snapped in place by pushing on the face plate 38, as shown by the arrows in FIG. 25. The face plate 38 is then rotated clockwise, as depicted in FIG. 26, which locks the face plate 58 to the base mounting plate 26 under spring tension.

Removal of the wheel cover 20 is shown in FIGS. 27 and 28, with the face plate 38 pulled away firm the base mounting plate 26 and rotated counter clockwise. The base mounting plate 26 is then removed in the same manner as the preferred embodiment.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A wheel cover simulating a high profile automotive wheel and tire comprising,
   a) a base mounting plate removably attached to a wheel, said base mounting plate further comprises, a plurality of ring securing members spaced in a radial array adjacent to the mounting plate periphery, each ring securing member having a groove therein and said base mounting plate having a steel ring disposed within grooves in the securing members to provide a positive attachment of the base mounting plate to the wheel,
   b) face plate juxtapositioned with the base mounting plate, said face plate configured to partially cover a tire sidewall and a central portion of a wheel, and
   c) means for urging the face plate toward the base mounting plate in such a manner as to yield when the tire bulges due to weight induced distortion and road hazard impact, thus permitting the face plate to give way at the tire bulge while retaining contiguous engagement of the face plate to the tire.

2. A wheel cover simulating a high profile automotive wheel and tire comprising,
   a) a base mounting plate removably attached to a wheel,
   b) face plate juxtapositioned with the base mounting plate, said face plate configured to partially cover a tire sidewall and a central portion of a wheel, said face plate further comprises a plurality of individual sections extending from a central point simulating a high profile automotive wheel, and
   c) means for urging the face plate toward the base mounting plate in such a manner as to yield when the tire bulges due to weight induced distortion and road hazard impact, thus permitting the face plate to give way at the tire bulge while retaining contiguous engagement of the face plate to the tire.

3. The wheel cover simulating a high profile automotive wheel and tire as recited in claim 2, wherein said base mounting plate having a plurality of securing tab slots adjacent to the mounting plate's periphery.

4. The wheel cover simulating a high profile automotive wheel and tire as recited in claim 2, wherein said base mounting plate further comprises a dome shaped body facing outwardly from the wheel.

5. The wheel cover simulating a high profile automotive wheel and tire as recited in claim 2, wherein said base mounting plate is fabricated of acrylonitrile butadeine styrene (ABS) thermoplastic.

6. The wheel cover simulating a high profile automotive wheel and tire as recited in claim 2, wherein said face plate further comprises a centrally positioned raised portion simulating a plurality of lug bolts that are spaced on a diametrical bolt center.

7. The wheel cover simulating a high profile automotive wheel and tire as recited in claim 2, wherein said face plate further comprises a plurality of securing tabs each having an outward-facing flange, such that when the face plate is forced away from one side by tire bulging, the flange catches the face plate, thereby preserving a mechanical association between the base mounting plate and the face plate.

8. The wheel cover simulating a high profile automotive wheel and tire as recited in claim 7 wherein each securing tab further comprises an integral self adjusting ridge between the outward-facing flange and the face plate to provide a self-adjusting position when the face plate is forced away from one side by tire bulging.

9. The wheel cover simulating a high profile automotive wheel and tire as recited in claim 2, wherein said face plate is fabricated of acrylonitrile butadeine styrene (ABS) thermoplastic.

10. The wheel cover simulating a high profile automotive wheel and tire as recited in claim 9 wherein said face plate fabricated of acrylonitrile butadeine styrene (ABS) thermoplastic is painted.

11. The wheel cover simulating a high profile automotive wheel and tire as recited in claim 9 wherein said face plate fabricated of acrylonitrile butadeine styrene (ABS) thermoplastic is chrome plated.

12. The wheel cover simulating a high profile automotive wheel and tire as recited in claim 2 wherein said means for urging the face plate against the base mounting plate further comprises a plurality of extension springs having looped ends that are attached between the face plate and the base mounting plate to maintain a close relationship therebetween.

13. A wheel cover simulating a high profile automotive wheel and tire comprising, a) a base mounting plate attached to a wheel, said base mounting plate further comprises a plurality of ring securing members having grooves therein and a steel retaining ring disposed within grooves, b) face plate juxtapositioned with the base mounting plate configured to partially cover a tire sidewall and a central portion of a wheel rim, and c) means for urging the face plate toward the base mounting plate in such a manner as to yield when the tire bulges, thereby permitting the face plate to give way at the tire bulge, while still retaining proximal engagement of the face plate to the tire.

14. The wheel cover simulating a high profile automotive wheel and tire as recited in claim 13 wherein said face plate having a plurality of retaining tab slots.

15. The wheel cover simulating a high profile automotive wheel and tire as recited in claim 14 wherein said face plate further comprises a plurality of retaining tabs slideably interfacing with the tab slots in the face plate to align and retain the association of the base mounting plate and the face plate permitting the face plate, thus permitting the face plate to give way at the tire bulge, while still retaining proximal engagement of the face plate to the tire.

16. The wheel cover simulating a high profile automotive wheel and tire as recited in claim 13 wherein said base mounting plate and said face plate are fabricated of acrylonitrile butadeine styrene (ABS) thermoplastic.

17. The wheel cover simulating a high profile automotive wheel and tire as recited in claim 13 wherein said means for urging the face plate toward the base mounting plate further comprises an extension spring having inward-facing ends, which are centrally positioned between face plate and the base mounting plate, said face plate having an integrally formed, spring retaining cup surrounding the extension spring, and both the base mounting plate and face plate having a spring catch adjacent to the spring to permit the spring to be simultaneously attached to both the base mounting plate and face plate.

* * * * *